United States Patent [19]

Tanabe et al.

[11] Patent Number: 5,026,478

[45] Date of Patent: Jun. 25, 1991

[54] METAL HOLDER AND PROTECTOR FOR A DISPOSABLE PLASTIC CAPSULE

[75] Inventors: Kazushige Tanabe, Tokyo; Katsutoshi Bonkohara, Yokohama, both of Japan

[73] Assignee: Nippon Roki Co., Ltd., Tokyo, Japan

[21] Appl. No.: 518,520

[22] Filed: May 3, 1990

[51] Int. Cl.⁵ .................................. B01D 27/08
[52] U.S. Cl. ........................ 210/232; 210/440; 210/443; 210/455; 55/503; 55/508
[58] Field of Search .............. 210/232, 238, 440, 443, 210/445, 441, 442, 453, 455; 55/503, 508

[56] References Cited

U.S. PATENT DOCUMENTS

| | | | |
|---|---|---|---|
| 3,958,433 | 5/1976 | Bochan | 210/445 |
| 3,979,295 | 9/1976 | Markley | 210/445 |
| 4,126,559 | 11/1978 | Cooper | 210/445 |
| 4,367,081 | 1/1983 | Harvey | 210/445 |
| 4,731,178 | 3/1988 | Rosenberg | 210/232 |
| 4,874,513 | 10/1989 | Chakraborty et al. | 210/445 |

Primary Examiner—Robert A. Dawson
Assistant Examiner—Wanda L. Millard
Attorney, Agent, or Firm—Donald W. Hanson

[57] ABSTRACT

A disposable capsule filter extremely suited for filtering paints, inks and the like which contain an organic solvent. The filter comprises a disposable capsule accommodating filter elements and a metal holder accommodating the capsule for the purpose of preventing rupture of the capsule. The capsule is formed from a plastic material by blow molding or pressure forming. The capsule has an outwardly projecting portion in contact with a clamped portion of the metal holder.

2 Claims, 3 Drawing Sheets

METAL HOLDER AND PROTECTOR FOR A DISPOSABLE PLASTIC CAPSULE

BACKGROUND OF THE INVENTION

This invention relates to a disposable capsule filter, which is particularly suited to the filtering of paint, ink, etc. containing an organic solvent.

As a liquid filter for water as well as food and pharmaceutical products, etc., for increasing the speed of operation of replacing filter elements, disposable capsule filters as shown in FIG. 5 are extensively used, in which filter element 2 is set in advance in synthetic resin vessel 1 and is discarded together with vessel 1 when it is clogged.

However, filters for paints and varnish, particularly magnetic paint, inks, etc. can be only with difficultly be provided as disposable filter. This is so because such paints or the like contain a great quantity of strong organic solvent having a strong polarity. If a disposable capsule filter is used for such paint for long period of time, the vessel is gradually attacked by the organic solvent which may lead to its rupture with internal pressure increase and to subsequent possible fire hazards.

Further, paints and varnish, inks, etc. usually have a high viscosity, and their filtering inevitably dictates high pressure loss. For this reason, it is very difficult to maintain pressure resistance with the sole plastic material of the capsule portion. If it is intended to secure the pressure resistance with the sole plastic material, it is necessary to provide a very large thickness for the vessel. Such a vessel is economically very inadequate as so-called disposable filter. In order to solve this economical problem, the thickness of plastic vessel is reduced to a threshold thickness such that corrosive attack can be withstood, and for the purpose of increasing the pressure resistance, an upper metal holder is fitted on the plastic vessel and united with a lower metal holder with a V-band clamp when using the filter. It is well known in the art that among current techniques of plastic molding that injection molding is most inexpensive. However, with this molding technique, it is impossible to form a large swelled portion 11 as shown in FIG. 2. Therefore, as shown in FIG. 3, upper and lower vessel parts or halves 12 and 13 have to be independently injection molded and bonded together using supersonic waves or high frequency wave or heat. If a vessel formed in this way is used for filtering a fluid containing a strong solvent as base, a portion of the vessel, to which strong heat was given, i.e., a bonded portion having been deteriorated by oxidization, is strongly attacked by the solvent, and this will give rise to leakage in the use of the filter.

Instead of providing swelled portion 11 as shown in FIG. 3, it is conceivable to form as increased thickness portion 14 corresponding in position to a V-band clamp, as shown in FIG. 4. However, it is very common that such molding will produce a commonly termed sink mark in the local increased thickness portion 14, such a sink mark having to be removed by subsequent machining. Further, it is a most significant problem in this case that a plastic material capable of withstanding strong solvents, typically polypropyrene, is highly fragile, so that if a strong stress is produced in increased thickness portion 14 with a V-band clamp or the like, cracks may be formed which may cause bursting. For this reason, a vessel having a shape as shown in FIG. 4 is substantially practically infeasible.

SUMMARY OF THE INVENTION

This invention has an object of providing a disposable capsule filter which can be safely used for the filtering of paint or the like containing an organic solvent having high flammability.

Another object of the invention is to provide a filter which can be manufactured at so low cost that it can be a disposable capsule filter.

A further object of the invention is to provide a disposable capsule filter with which the sealing property is more superior the higher the liquid pressure.

To attain the above objects of the invention, there is provided a disposable capsule accommodating a filter element and a metal holder for accommodating the capsule for the purpose of preventing rupture of the capsule, the capsule being produced by blow molding or pressure forming of a plastic material and having an outwardly projecting portion in contact with a metal holder clamp portion.

The above and other objects and advantages of the invention will become more apparent from the following description with reference to the accompanying drawings.

DETAILED DESCRIPTION OF THE PREFERRED EMBODIMENTS

Now, a desired embodiment of the invention will be described with reference to the drawings.

Figure 1:
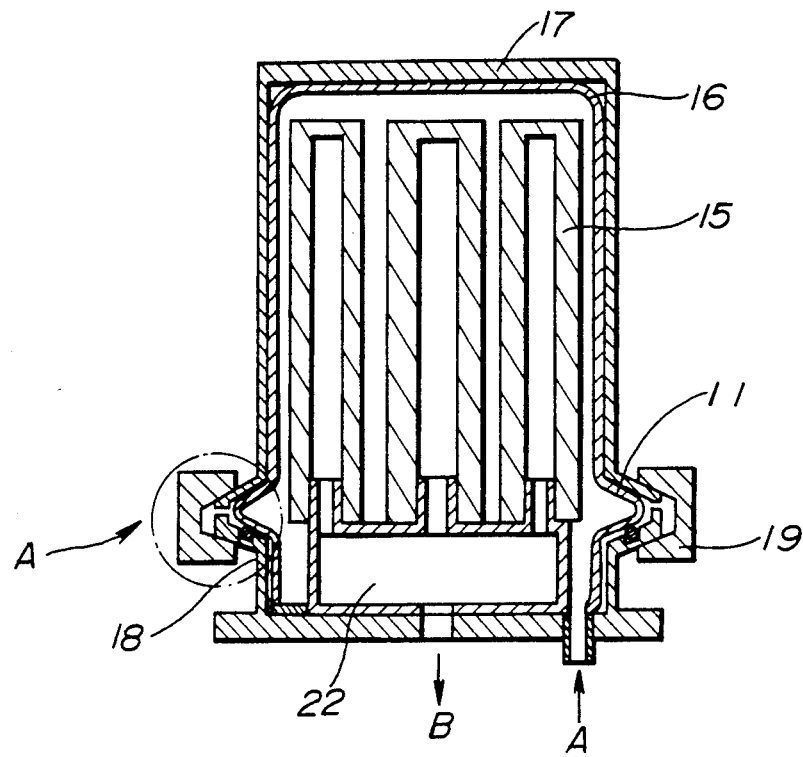
FIG. 1 is a sectional view showing an embodiment of the invention.

FIG. 1 is a sectional view showing an embodiment of the invention. As is shown, a plurality of filter elements 15 are accommodated in cylindrical polypropyrene capsule 16 open at the lower end. Capsule 16 has outwardly projecting portion or property 11 at the lower portion.

Cylindrical capsule 16 is accommodated in cylindrical upper metal holder 17 open at the lower end and cylindrical lower metal holder 18. Upper and lower metal holders 17 and 18 are secured to each other by V-band clamp 14.

Cylindrical capsule 16 used according to the invention may be formed by blow molding process or pressure forming process. With such molding processes, capsule 16 with projection 11 can be readily formed. Cylindrical capsule 16 desirably is made of a highly fragile polypropyrene material and has a small thickness. Since the projection 11 is hollow and is excellently elastic, no cracks or the like will be produced in it when it is clamped by a V-band clamp.

Figure 2:
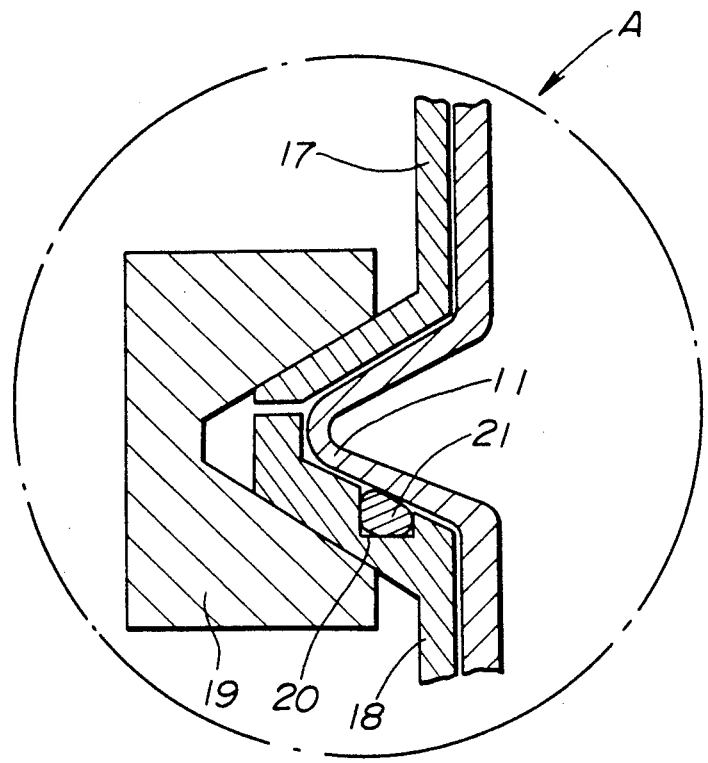
FIG. 2 is a fragmentary enlarged-scale sectional view showing portion A in FIG. 1.
Figure 3:
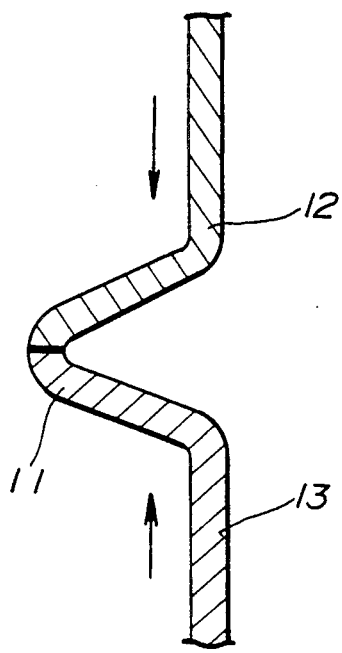
FIG. 3 is a fragmentary sectional view showing a capsule obtained by bonding together upper and lower capsule parts or halves.
Figure 4:
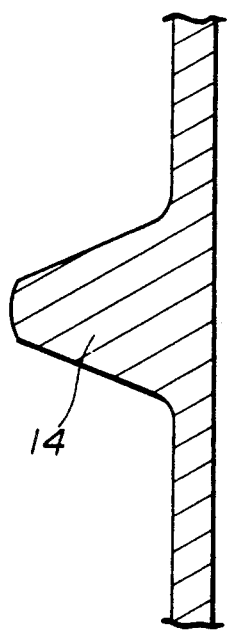
FIG. 4 is a fragmentary sectional view of a capsule having an increased thickness portion corresponding in position to a V-band clamp.
Figure 5:
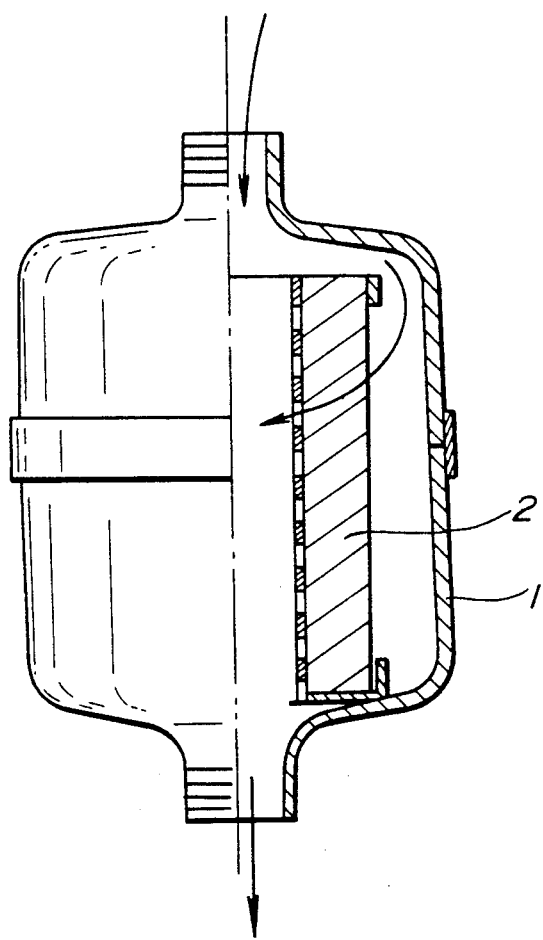
FIG. 5 is a sectional view showing a prior art filter.

Referring now to FIG. 2, loser metal holder 18 has ring-like recess 20, and O-ring 21 for preventing leak of process liquid (primary side fluid) is fitted in recess 20. With an increase of the liquid pressure in capsule 16, the pressure applied to projection 11 of the capsule is increased, and O-ring 21 is strongly pushed by the capsule to increase the sealing property of the O-ring.

While in the above embodiment upper and lower metal holders 17 and 18 are clampedly united by a V-band clamp, this is not essential, and any other suitable means may be adopted so long as it can uniformly clamp upper and lower metal holders 17 and 18.

To filter process liquid using the filter according to the invention, the process liquid to be filtered is introduced from port A in FIG. 1, and filtrate resulting after filtering through filter elements 15 is led through filtrate accommodation chamber 22 to be discharged through outlet port B.

As has been described in the foregoing, according to the invention, a plastic capsule accommodating filter elements is accommodated in a metal holder. Thus, while rupture of the plastic capsule can be prevented with a swelling portion provided in a lower end portion of the plastic capsule, the upper and lower metal holder parts can be effectively secured to each other by using the swelling portion. Further, with an O-ring provided between the swelling portion and metal holder, with increase of the liquid pressure the swelling portion strongly pushes the O-ring, and thus an excellent sealing property can be obtained. The filter thus can be sufficiently safely used for filtering a paint or the like containing an organic solvent, which is highly viscous and highly attacking and has high fire hazardousness. It is thus possible to obtain excellent effects of disposable capsule filter.

What is claimed is:

1. A filter for pressurized filtration comprising a disposable capsule accommodating one or more filter elements and a metal holder accommodating said capsule for the purpose of preventing rupture of said capsule, said capsule being formed from a plastic material by blow molding or pressure forming, said capsule having an outwardly projecting swelling portion, said metal holder comprising upper and lower metal holder parts, both said metal holder parts being coupled together about said outwardly projecting swelling portion of said capsule so as to be in contact therewith, the lower metal holder part being formed with a ring like recess and having an O-ring fitted in said recess and contacted by said outwardly projecting swelling portion upon pressurization of the capsule.

2. The filter according to claim 1, wherein said upper and lower metal holder parts are secured to each other by a V-band clamp.

* * * * *